United States Patent
Kim et al.

(10) Patent No.: US 10,872,522 B2
(45) Date of Patent: Dec. 22, 2020

(54) ELECTRONIC APPARATUS AND CONTROLLING METHOD THEREOF

(71) Applicant: SAMSUNG ELECTRONICS CO., LTD., Suwon-si (KR)

(72) Inventors: Dongwook Kim, Suwon-si (KR); Kwanyoung Kim, Suwon-si (KR); Hojune Yoo, Suwon-si (KR); Seungil Yoon, Suwon-si (KR); Jaemyung Hur, Suwon-si (KR); Minsup Kim, Suwon-si (KR); Jungseop Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/522,103

(22) Filed: Jul. 25, 2019

(65) Prior Publication Data

US 2020/0090499 A1 Mar. 19, 2020

(30) Foreign Application Priority Data

Sep. 13, 2018 (KR) .................. 10-2018-0109751

(51) Int. Cl.
*G08C 23/04* (2006.01)
*H04N 21/485* (2011.01)
*H04N 21/41* (2011.01)

(52) U.S. Cl.
CPC ......... *G08C 23/04* (2013.01); *G08C 2201/92* (2013.01); *H04N 21/4131* (2013.01); *H04N 21/485* (2013.01)

(58) Field of Classification Search
CPC .... H04B 10/80; G08C 23/04; H04N 21/4131; H04N 5/4403
See application file for complete search history.

(56) References Cited

U.S. PATENT DOCUMENTS

| 7,378,984 | B2 | 5/2008 | Suzuki et al. |
| 7,561,215 | B2 | 7/2009 | Kim et al. |

(Continued)

FOREIGN PATENT DOCUMENTS

| EP | 2 472 894 A1 | 7/2012 |
| EP | 2 692 039 A1 | 7/2015 |

(Continued)

OTHER PUBLICATIONS

Communication dated Dec. 9, 2019 issued by the European Intellectual Property Office in counterpart European Application No. 19179827.1.

*Primary Examiner* — Dzung D Tran
(74) *Attorney, Agent, or Firm* — Sughrue Mion, PLLC

(57) ABSTRACT

An electronic apparatus includes a memory storing a firmware including a plurality of pieces of code set information corresponding to a plurality of external devices; a communication interface; and a processor configured to: receive an infrared (IR) signal corresponding to an external device of the plurality of external devices through the communication interface, and identify code set information corresponding to the IR signal among the plurality of pieces of code set information by sequentially using a header area of the received IR signal and a data area of the received IR signal, and based on a control command being input from a remote controller of the electronic apparatus, generate the IR signal corresponding to the control command based on the identified code set information.

18 Claims, 13 Drawing Sheets

(56) References Cited

U.S. PATENT DOCUMENTS

| | | | |
|---|---|---|---|
| 7,562,128 | B1 | 7/2009 | Caris et al. |
| 2006/0064209 | A1 | 3/2006 | Park |
| 2009/0237287 | A1 | 9/2009 | D'Hoore et al. |
| 2010/0053468 | A1 | 3/2010 | Harvill |
| 2014/0259032 | A1* | 9/2014 | Zimmerman ...... H04N 21/4667 725/9 |
| 2015/0137959 | A1 | 5/2015 | Kim et al. |
| 2018/0012485 | A1* | 1/2018 | Park ........................ G08C 23/04 |
| 2018/0067980 | A1* | 3/2018 | Suri ......................... G06F 8/437 |
| 2018/0068555 | A1* | 3/2018 | Su ........................ H04L 12/2818 |
| 2019/0082050 | A1* | 3/2019 | Brimshan ............. H04M 3/493 |

FOREIGN PATENT DOCUMENTS

| | | |
|---|---|---|
| JP | 5-236294 A | 9/1993 |
| JP | 2003-179985 A | 6/2003 |
| JP | 2008-102339 A | 5/2008 |
| JP | 4369214 B2 | 11/2009 |
| JP | 5002637 B2 | 8/2012 |
| KR | 10-2004-0096472 A | 11/2004 |
| KR | 10-1121778 B1 | 3/2012 |
| KR | 10-2015-0056273 A | 5/2015 |

\* cited by examiner

FIG. 4
(a)
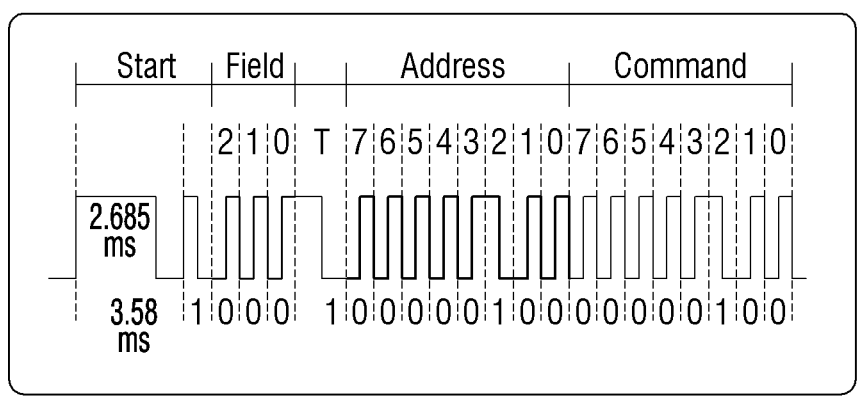
(b)
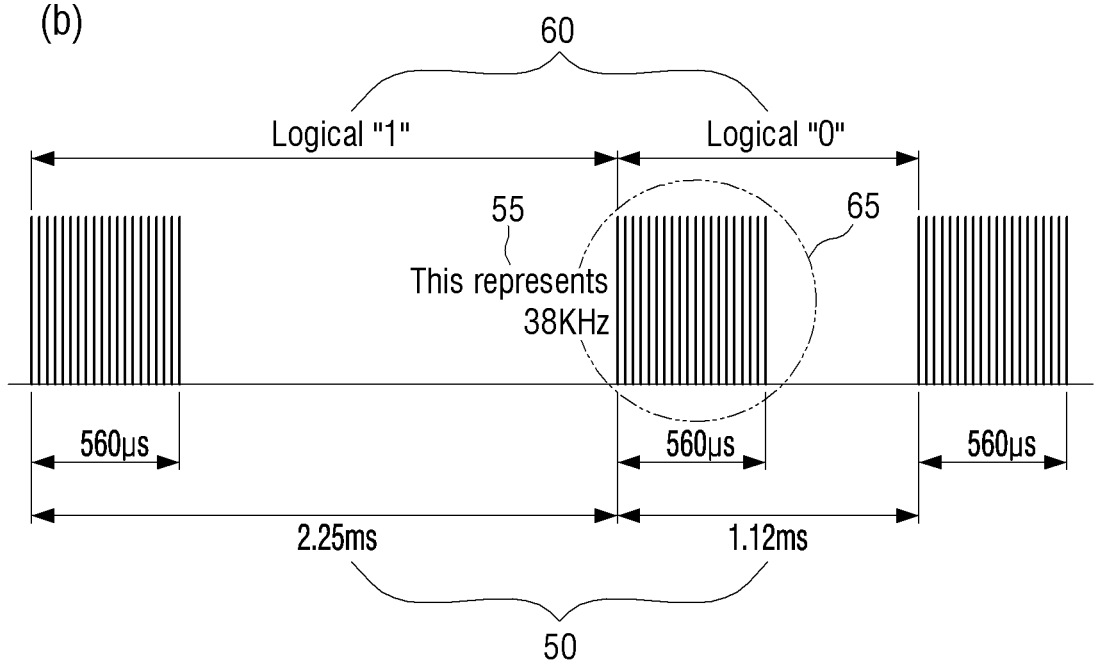

FIG. 5

| MANUFACTURER | PRODUCT TYPE | PRODUCT CODE | MODEL NUMBER | CONTROL OPERATION | KEY VALUE |
|---|---|---|---|---|---|
| A | AIR-CONDITIONER | AA16 | AR07J | TEMPERATURE up | #IR-A1111 |
| A | AIR-CONDITIONER | AA16 | AR07J | TEMPERATURE down | #IR-A1112 |
| A | AIR-CONDITIONER | AA16 | AR07J | WIND up | #IR-A1121 |
| A | AIR-CONDITIONER | AA16 | AR07J | WIND down | #IR-A1122 |
| A | AIR-CONDITIONER | AA18 | AR07K | TEMPERATURE up | #IR-A1211 |
| A | AIR-CONDITIONER | AA18 | AR07K | TEMPERATURE down | #IR-A1212 |
| A | AIR-CONDITIONER | AA18 | AR07K | WIND up | #IR-A1221 |
| A | AIR-CONDITIONER | AA18 | AR07K | WIND down | #IR-A1222 |
| A | REFRIGERATOR | AR18 | RF55K | TEMPERATURE up | #IR-A2111 |
| A | REFRIGERATOR | AR18 | RF55K | TEMPERATURE down | #IR-A2112 |
| B | AIR-CONDITIONER | BA16 | A16RN | TEMPERATURE up | #IR-B1111 |
| B | AIR-CONDITIONER | BA16 | A16RN | TEMPERATURE down | #IR-B1112 |
| B | AIR-CONDITIONER | BA16 | A16RN | WIND up | #IR-B1121 |
| B | AIR-CONDITIONER | BA16 | A16RN | WIND down | #IR-B1122 |

<PLURALITY OF PIECES OF CODE SET INFORMATION>

FIG. 9
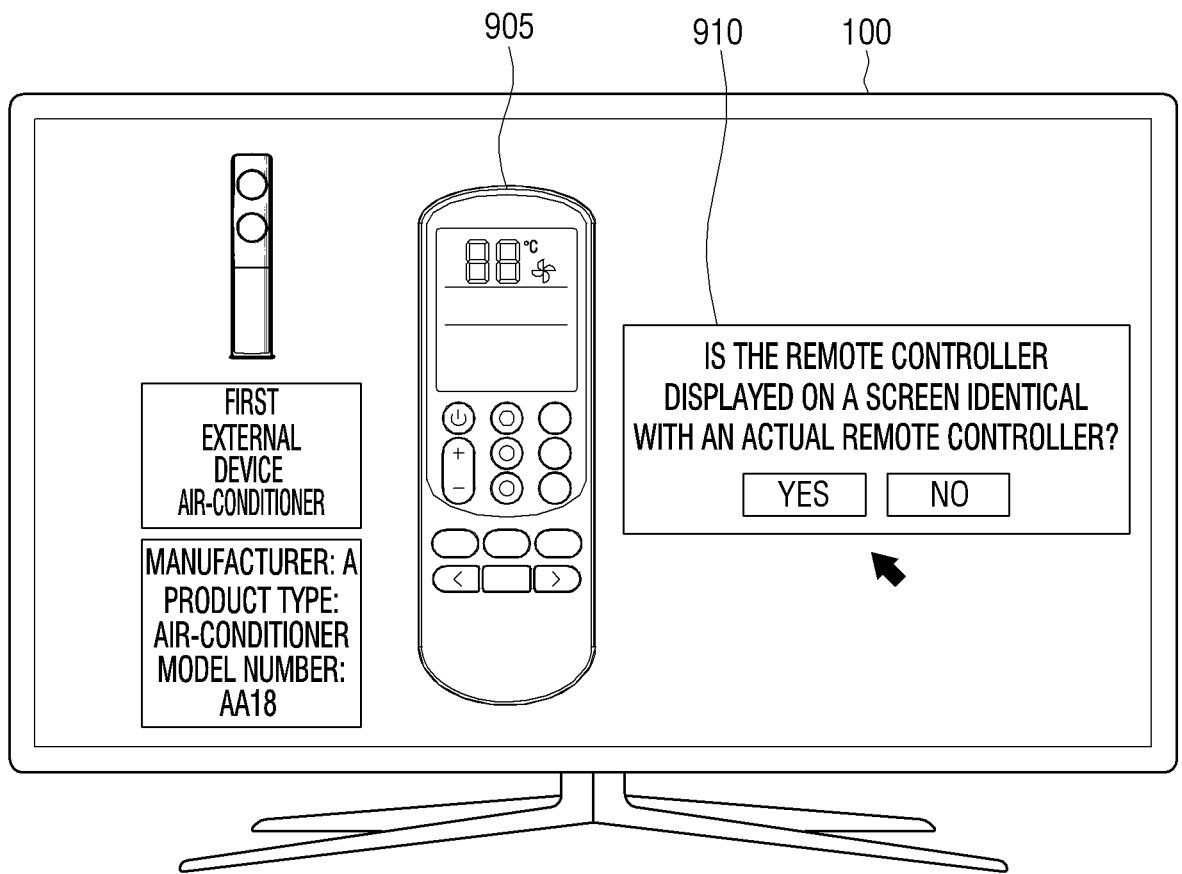
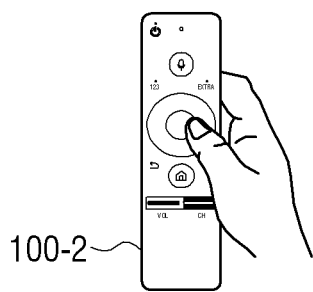

ELECTRONIC APPARATUS AND CONTROLLING METHOD THEREOF

CROSS-REFERENCE TO RELATED APPLICATIONS

This application claims is based on and claims priority under 35 U.S.C. § 119 to Korean Patent Application No. 10-2018-0109751, filed on Sep. 13, 2018, in the Korean Intellectual Property Office, the disclosure of which is incorporated herein by reference in its entirety.

BACKGROUND

Field

The disclosure relates to an electronic apparatus and a controlling method thereof and, more particularly, to an electronic apparatus for remotely controlling an external device and a controlling method thereof.

Description of the Related Art

In general, an electric home appliance may be remotely controlled using a remote controller corresponding to the home appliance. Recently, as the remotely controlled household appliances increase, a case in which a plurality of household appliances are used in one place is increasing. Here, a user should use each remote controller to control a plurality of home appliances in one place. In this case, a user may waste time to find a remote controller to control, when it is confusing that the plurality of remote controllers correspond to which home appliances.

Recently, an integrated control system for controlling a plurality of home appliances by one remote controller or an electronic apparatus has been introduced. Integrated control systems generally may use a Wi-Fi or a Bluetooth communication method, and a home appliance w may be controlled by a Wi-Fi or a Bluetooth communication method. The home appliances using a Wi-Fi or a Bluetooth communication method may be controlled by using a Wi-Fi or a Bluetooth communication module supported by a smartphone. However, there is a problem that the above integrated control system is not applicable to home appliances which may not be controlled by a Wi-Fi or a Bluetooth communication method.

For example, when a home appliance receives a signal only by an infrared communication method, it may not be possible to control the home appliance product with a smartphone. In addition, an electronic apparatus which manages the integrated control system using a Wi-Fi or a Bluetooth communication method may not control the home appliance using the infrared communication method.

SUMMARY

Embodiments may overcome the above disadvantages and other disadvantages not described above. Also, an embodiment is not required to overcome the disadvantages described above, and an embodiment may not overcome any of the problems described above.

The disclosure is designed to address the above problem, and the object of the disclosure is to provide an electronic apparatus which controls an external device using code set information corresponding to a received infrared (IR) signal and a controlling method thereof.

In accordance with an aspect of the present disclosure, there is provided an electronic apparatus including a memory storing a firmware including a plurality of pieces of code set information corresponding to a plurality of external devices; a communication interface; and a processor configured to: receive an infrared (IR) signal corresponding to an external device of the plurality of external devices through the communication interface, and identify code set information corresponding to the IR signal among the plurality of pieces of code set information by sequentially using a header area of the received IR signal and a data area of the received IR signal, and based on a control command being input from a remote controller of the electronic apparatus, generate the IR signal corresponding to the control command based on the identified code set information.

The processor may be further configured to control the electronic apparatus to transmit an IR signal corresponding to the control command to an external device corresponding to the identified code set information through the communication interface.

The header area of the received IR signal may include a signal pattern corresponding to a manufacturer and a product type, and the data area of the received IR signal may include a signal pattern corresponding to a control command for performing a specific operation.

The processor may be further configured to sequentially compare information included in the header area of the received IR signal and the data area of the received IR signal with a plurality of pieces of code set information stored in the memory according to a predetermined order.

The processor may be further configured to, based on the code set information corresponding to the received IR signal not being included in the plurality of pieces of code set information, transmit information corresponding to the received IR signal to an external server, receive the code set information corresponding to the received IR signal from the external server, and update the plurality of pieces of code set information to include the received code set information to.

The processor, based on the code set information corresponding to the received IR signal not being received from the external server for a predetermined time, may be further configured to provide a user interface (UI) for guiding a user to directly update the IR signal of the external device.

The code set information may include at least one of a manufacturer, a product type, a product code, a model number, and a key set, and the key set may include information which maps a key value to a corresponding function of the key value.

The processor may be further configured to update the plurality of pieces of code set information included in the firmware at a predetermined interval.

The processor, based on the code set information corresponding to the IR signal being identified, may be further configured to provide a user interface (UI) for registering the identified code set information, and the UI may include at least one of an image of a remote controller corresponding to the external device, a manipulation state of each button included in the remote controller, and a function of each button.

The communication interface may include an IR signal interface for receiving an IR signal transmitted from a remote controller of the external device; and a BLUETOOTH communication interface connected to the remote controller of the electronic apparatus for receiving the control command.

In accordance with an aspect of the present disclosure, there is provided a controlling method of an electronic apparatus, including receiving an infrared (IR) signal corresponding to an external device of a plurality of external devices through a communication interface;

identifying code set information corresponding to the IR signal among a plurality of pieces of code set information corresponding to the plurality of external devices by sequentially using a header area of the received IR signal and a data area of the received IR signal; and based on a control command being input from a remote controller of the electronic apparatus, providing the IR signal corresponding to the control command based on the identified code set information to the external device.

The header area of the received IR signal may include a signal pattern corresponding to a manufacturer and a product type, and the data area of the received IR signal may include a signal pattern corresponding to a control command for performing a specific operation.

The identifying of the code set information corresponding to the IR signal may include sequentially comparing information included in the header area of the received IR signal and the data area of the received IR signal with a plurality of pieces of code set information stored in a memory of the electronic apparatus according to a predetermined order.

The method may further include, based on the code set information corresponding to the received IR signal not being included in the plurality of pieces of code set information, transmitting information corresponding to the received IR signal to an external server, receiving the code set information corresponding to the received IR signal from the external server, and updating the plurality of pieces of code set information to include the received code set information.

The method may further include, based on the code set information corresponding to the received IR signal not being received from the external server for a predetermined time, providing a user interface (UI) for guiding a user to directly update the IR signal of the external device.

The code set information may include at least one of a manufacturer, a product type, a product code, a model number, and a key set, and the key set may include information which maps a key value to a function corresponding to the key value.

The method may further include updating a plurality of pieces of code set information included in a firmware of the electronic apparatus at a predetermined interval.

The method may further include, based on the code set information corresponding to the IR signal being identified, providing a user interface (UI) for registering the identified code set information, and the UI may include at least one of an image of a remote controller corresponding to the external device, a manipulation state of each button included in the remote controller, and a function of each button

BRIEF DESCRIPTION OF THE DRAWING FIGURES

The above and/or other aspects, features, and advantages of certain embodiments of the disclosure will be more apparent from the following description taken in conjunction with the accompanying drawings, in which:

FIG. 4 illustrates a format type of an IR signal, according to an embodiment;

FIG. 5 shows a plurality of pieces of code set information stored in a memory of an electronic apparatus, according to an embodiment;

FIG. 9 shows a UI for confirming a remote controller of an external device selected by an electronic apparatus by a user, according to an embodiment;

DETAILED DESCRIPTION OF THE EMBODIMENTS

Figure 1:
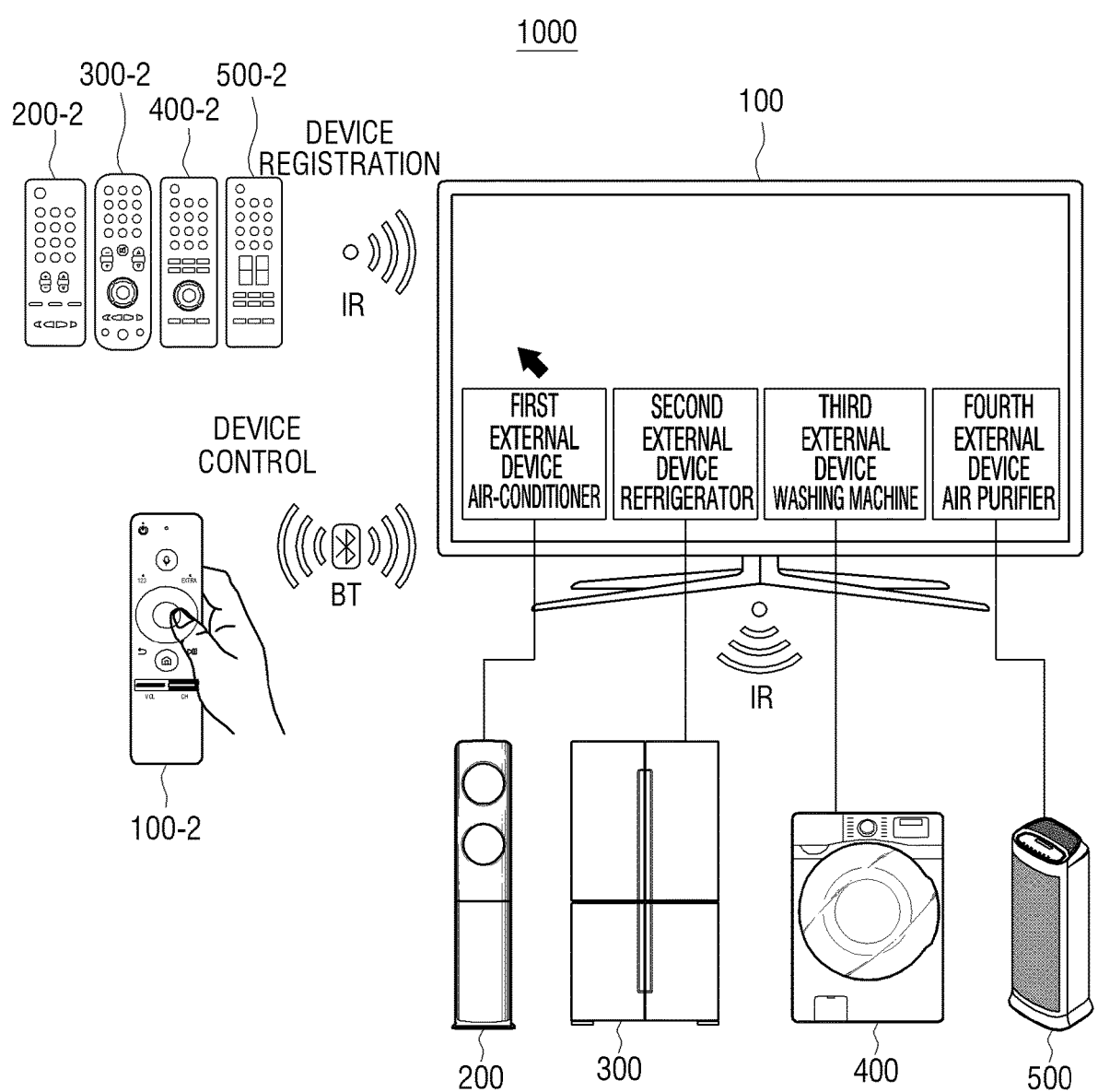
FIG. 1 shows an example of a control system for controlling a plurality of external devices using an electronic apparatus, according to an embodiment.

Terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different embodiments. In other words, although elements having the same reference numerals are all illustrated in a plurality of drawings, the plurality of drawings do not mean one embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components, or a combination thereof.

These embodiments are capable of various modifications and have various embodiments, and specific embodiments are illustrated in the drawings and described in detail in the description. It should be understood, however, that it is not intended to limit the scope of the specific embodiments but includes all transformations, equivalents, and alternatives falling within the disclosed spirit and scope. When it is decided that a detailed description for the known art related to the disclosure may unnecessarily obscure the gist of the disclosure, the detailed description will be omitted.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

FIG. 1 is a view to describe a plurality of external device control system using an electronic apparatus.

Referring to FIG. 1, a control system 1000 for controlling a plurality of external devices 200 to 500 may include an electronic apparatus 100, a remote controller 100-2 of the electronic apparatus 100, the plurality of external devices 200 to 500, and remote controllers 200-2 to 500-2 of the external device.

Here, the electronic apparatus 100 may mean an electronic apparatus capable of receiving and transmitting an infrared (IR) signal. For example, the electronic apparatus may be an electronic apparatus or a display apparatus including the IR module.

The remote controller 100-2 of the electronic apparatus 100 may correspond to a remote controller for controlling the electronic apparatus 100 from a far distance. Here, the remote controller 100-2 of the electronic apparatus 100 may communicate with the electronic apparatus 100 by a Bluetooth method.

The plurality of external devices 200 to 500 may be electronic apparatuses capable of receiving an IR signal. For example, the external devices may be home appliances such as an air-conditioner 200, a refrigerator 300, a washing machine 400, an air purifier 500, or the like, including the IR module.

The remote controllers 200-2 to 500-2 of the plurality of external devices 200 to 500 may be remote controllers capable of transmitting the IR signal. Here, the remote controllers 200-2 to 500-2 of the plurality of external devices 200 to 500 may communicate with the electronic apparatus 100 or the plurality of external devices 200 to 500 by IR method.

In order to control the plurality of external devices 200 to 500 by one remote controller, each device may be registered to the electronic apparatus 100. The plurality of external devices 200 to 500 include the IR module and may communicate with the remote controllers 200-2 to 500-2 of the plurality of external devices 200 to 500 for controlling the plurality of external devices from a remote distance using the IR signal.

When the IR signal is transmitted from the remote controllers 200-2 to 500-2 of the plurality of external devices 200 to 500, the electronic apparatus 100 may receive the IR signal. The electronic apparatus 100 may identify a specific device corresponding to the received IR signal by comparing with a plurality of pieces of prestored code set information.

When the electronic apparatus 100 identifies the specific device corresponding to the IR signal, the electronic apparatus 100 may register the specific device. Referring to FIG. 1, in an embodiment house appliances including the IR module such as the air-conditioner 200, the refrigerator 300, the washing machine 400, the air purifier 500, or the like, are registered to the electronic apparatus.

A user may remotely control the plurality of external devices 200 to 500 using the remote controller 100-2 of the electronic apparatus 100. Here, the remote controller 100-2 of the electronic apparatus 100 may use a Bluetooth communication method. The user may select which external device from among the plurality of external devices 200 to 500 to control using a UI displayed on the electronic apparatus 100.

The user may remotely control the external device selected by the user through the electronic apparatus 100 using an application, or the like, installed in the electronic apparatus 100. To be specific, the electronic apparatus 100 may generate and transmit the IR signal using the prestored code set information to control the external device selected by the user.

Consequently, the user may remotely control the plurality of external devices 200 to 500 registered in the electronic apparatus 100 only by the remote controller 100-2 of the electronic apparatus 100 without using the remote controllers 200-2 to 200-5 of the plurality of the external devices 200 to 500.

Figure 2:
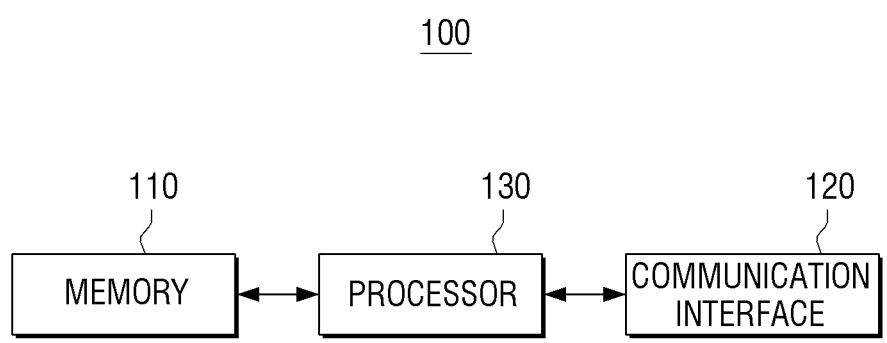
FIG. 2 is a block diagram of an electronic apparatus according to an embodiment.

FIG. 2 is a block diagram of an electronic apparatus according to an embodiment.

Referring to FIG. 2, the electronic apparatus 100 may be composed of a memory 110, a communication interface 120, and a processor 130.

The memory 110 may store firmware including information of a plurality of code sets, which may be referred to as a plurality of pieces of code set information for controlling each of the plurality of external devices. The information on the plurality of code sets may include at least one of a manufacturer, a product type, a product code, a model number, a keyset of the plurality of external devices. The key set may include information of mapping a key value to a function corresponding to the key value.

For example, the memory 110 may be implemented as at least one of a non-volatile memory, volatile memory, a flash memory type, solid state drive (SSD), read-only memory (ROM), random-access memory (RAM), a hard disk type, a multimedia card micro type, a card type memory (for example, secure digital (SD) memory or an extreme digital (xD) memory).

The memory may be implemented not only as a storing medium inside the electronic apparatus but also as an external storing medium, for example, a micro SD card, a USB memory, or web server through network, or the like.

The communication interface 120 may further include various wired/wireless interfaces that may be connected to external devices other than a high definition multimedia interface (HDMI) port as described above. For example, a wired interface such as a universal serial bus (USB) terminal, a composite video banking sync (CVBS) terminal, a component terminal, an S-video terminal (analog) and a digital visual interface (DVI) terminal, and a wireless interface using communication protocols such as a wireless LAN (WLAN), wireless fidelity (Wi-Fi), Wi-Fi Direct, Bluetooth, radio frequency identification (FID), infrared data association (IrDA), UltraWideband (UWB), ZigBee, digital living network alliance (DLNA), and the like.

The communication interface 120 may receive an IR signal of a remote controller corresponding to one of a plurality of external devices through a communication interface and transmit the IR signal according to the user's control command. The electronic apparatus 100 may generate a control command to remotely control the external device 200 using the code set information corresponding to the received IR signal. The electronic apparatus 100 may transmit or otherwise send the IR signal corresponding to the control command toward the external device 200.

In addition, the Bluetooth communication signal may be received from the remote controller 100-2 of the electronic apparatus 100. The communication interface 120 may include the Bluetooth communication module capable of receiving and analyzing the Bluetooth communication signal.

The processor 130 performs an overall control operation of the electronic apparatus 100. Specifically, the processor 130 performs a function to control overall operations of the electronic apparatus 100.

The processor 130 may be implemented as a digital signal processor (DSP), a microprocessor, and a time controller (TCON) for processing a digital image signal, but is not limited thereto. The processor 130 may include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 130 may be implemented in a system on chip (SoC) type or a large scale integration (LSI) type which a processing algorithm is built therein or in a field programmable gate array (FPGA) type.

The processor 130 may identify code set information corresponding to the IR signal among a plurality of pieces of code set information by sequentially using the header area and the data area of the IR signal.

The processor 130 may identify whether there is information corresponding to the received IR signal among a plurality of pieces of code set information stored in the memory 110. The processor 130 may first receive information included in the header area of the IR signal through the communication interface 120 and may identify whether the information included in the header area of the IR signal is included in a plurality of pieces of code set information stored in the memory 110.

Here, the header area of the IR signal may include a signal pattern corresponding to the manufacturer and the product type. The data area of the IR signal may include a signal pattern corresponding to a control command for performing a specific operation. The processor 130 may identify at least one of the timing information, the carrier frequency information, the logic definition information, and the waveform information of the IR signal in the signal pattern included in the header area and the data area of the IR signal.

The pattern of the IR signal may be different according to the manufacturer, product type, model, and the like. For example, in an embodiment, in the air-conditioner of a manufacturer A, the timing information corresponding to logic 1 is 5 ms and the time corresponding to logic 0 is 2.5 ms when the IR signal is transmitted. In an embodiment, in the air-conditioner of a manufacturer B, the timing information corresponding to logic 1 is 3 ms and the time corresponding to logic 0 is 1.5 ms when the IR signal is transmitted. In addition, in an embodiment these features are unified for each manufacturer and product type. A plurality of pieces of code set information including these features may be stored in the electronic apparatus 100. If the electronic apparatus 100 analyzes the received IR signal and identifies that the timing information corresponding to logic 1 is 5 ms and the timing information corresponding to logic 0 is 2.5 ms, the electronic apparatus 100 may identify that the received IR signal is a signal which is used by the air-conditioner of the manufacturer A.

By this method, the processor 130 may identity the code set information corresponding to the external device by identifying at least one of the timing information, carrier frequency information, logic definition information, and waveform information of the IR signal.

The processor 130 may analyze the signal pattern included in the header area of the IR signal and identify the manufacturer and the product type. Since the signal patterns are different in accordance with the manufacturer and the product type, the processor 130 may identify the manufacturer and the product type of the external device corresponding to the received IR signal by comparing a signal pattern included in a header area of the received IR signal with a plurality of pre-stored code set information.

The processor 130 may receive the information included in the data area after receiving the information included in the header area of the IR signal. If the header area of the received IR signal is analyzed and the manufacturer and the product type of the external device are identified, a search target may be reduced. For example, when the processor 130 identifies the air-conditioner of the manufacturer A as a result of analyzing the header area of the IR signal, the range of the subsequent search target may be narrowed to the manufacturer A and an air-conditioner. If the initial range of the search target was 100%, the search target may be narrowed to 10% after identifying the manufacturer and the product type through the header area.

The processor 130 may identify whether the information included in the data area of the IR signal is included in the plurality of pieces of code set information stored in the memory 110. The processor 130 may obtain the features identified from the received IR signal and compare the features with plurality of pieces of prestored code set information.

For example, the processor 130 may obtain five features such as the timing information for logic 1 as 2.25 ms, the timing information for logic 0 as 1.12 ms, the time corresponding to the bit marker as 560 μs (micro seconds), a carrier frequency as 38 kHz, and a combination pattern of logic 1 and logic 0, as shown or example in FIG. 4, by analyzing the received IR signal. The processor 130 may identify the code set information corresponding to the received IR signal using the obtained five features. Obtaining the five features is only one embodiment, and the processor 130 may additionally obtain various features in actual implementations.

The processor 130 may compare the information included in the header area and the data area of the received IR signal with a plurality of pieces of code set information stored in the memory 110 according to a predetermined order. Here, the predetermined order may mean the order of comparing the features of the IR signal and may be changed. The operation of sequentially comparing a plurality of pre-stored code set information may correspond to a tree structure algorithm. The tree structure algorithm may mean that the range of the search target is gradually narrowed. An embodiment in which a tree structure algorithm is applied will be described below.

For example, the processor 130 may sequentially compare the carrier frequency, the time corresponding to a bit marker, timing information for logic 1, timing information for logic 0, and the combination pattern of logic 1 and logic 0, from among the five features as described above, with a plurality of pieces of code set information stored in the memory 110. The processor 130 may limit the list corresponding to the carrier frequency of 38 kHz to the search target. The processor 130 may limit a list having a time corresponding to a bit marker of 560 µs, from among the objects of which the carrier frequency is 38 kHz, to a search target. Then, the processor 130 may limit the search list to a list of which the timing information for the logic 1 is 2.25 ms, among the list in which the carrier frequency is 38 kHz and the time corresponding to the bit marker is 560 µs.

As described above, the processor 130 may limit the search target based on a predetermined order and the predetermined order may be changed by a user.

In the meantime, the processor 130 may compare the data of the input IR signal in a temporal order. For example, in an embodiment information corresponding to the data area of the IR signal is received in the order of "101011110000."

The processor 130 may distinguish the received IR signal based on a predetermined number of bits. In an embdoiment, the IR signal composed of four bits is assumed, and it is assumed that the IR signal corresponding to 1010/1111/0000 is received. The processor 130 may limit a list in which the data starts with 1010 to a search target. The processor 130 may limit a list in which next data is 1111 among the data starting with 1010 to a search target. In addition, the processor 130 may limit a list in which the next data is 0000 among the list composed of 1010/1111 to a search target.

The processor 130 may divide the search target into an upper item and a lower item. The criteria for dividing the upper item and the lower item may be a predetermined order or a time order. The processor 130 may limit the search target by dividing the search target into an upper item and a lower item or shorten a processing time while reducing the search target. Consequently, the processor 130 may identify the code set information corresponding to the IR signal from the limited search targets.

The IR signal received by the processor 130 may be information corresponding to a button of the remote controller 200-2 of the external device 200. The IR signal identified by the processor 130 may be the IR signal of a specific button, and the processor 130 may identify whether the received IR signal is a signal corresponding to which device among the plurality of external devices which is stored in the memory. Based on the processor 130 identifying that the received IR signal is a signal corresponding to which device, the processor 130 may obtain the code set information including an entire key value of the identified device.

The processor 130 may transmit the obtained code set information to the internal software module or the memory 110, or store the same. The processor 130 may perform an operation to register an external device while storing the code set information in the software module or the memory 110. The user may use the code set information corresponding to the registered external device.

In addition, when the code set information corresponding to the IR signal is identified, the processor 130 may provide a UI for registering the identified code set information, and the UI may include at least one of an image of a remote controller corresponding to the external device, a manipulation state of each button included in the remote controller, and a function of each button. The details will be described with reference to FIGS. 9 to 11 below.

The processor 130 may control an external device using the code set information corresponding to the registered external device. The user may transmit a control command to the electronic apparatus 100 using the remote controller 100-2 of the electronic apparatus 100. For example, in an embodiment the electronic apparatus 100 includes a display and a UI for controlling the external device is displayed on the display. The user may select a control item included in the UI through the remote controller 100-2 of the electronic apparatus 100.

When a control command, for example selecting a UI displayed on the electronic apparatus 100, is inputted from the remote controller 100-2 of the electronic apparatus 100, the processor 130 may generate the IR signal corresponding to the control command based on the identified code set information. Here, the processor 130 may transmit the IR signal corresponding to the control command to the external device corresponding to the code set information identified through the communication interface.

In addition, when the code set information corresponding to the received IR signal is not identified, the processor 130 may transmit the information on the received IR signal to an external server, receive the code set information corresponding to the IR signal received from the external server, and perform the update to add the received code set information to the plurality of pieces of prestored code set information.

The external server may store the plurality of latest code set information, and store the plurality of pieces of code set information not stored in the electronic apparatus 100. The processor 130 may identify the information not stored in the memory 110 of the electronic apparatus 100 through the external server.

When the processor 130 fails to receive the code set information corresponding to the IR signal received from the external server for a predetermined time, the processor 130 may provide a UI for guiding to update the IR signal of the external device directly by the user. Details will be described in FIG. 12 below.

Meanwhile, the processor 130 may update the plurality of pieces of code set information included in the firmware at predetermined intervals or add new code set information. The firmware may be updated to the latest firmware via the external server and the electronic apparatus 100 may store the latest code set information in the memory 110 by the update.

Figure 3:
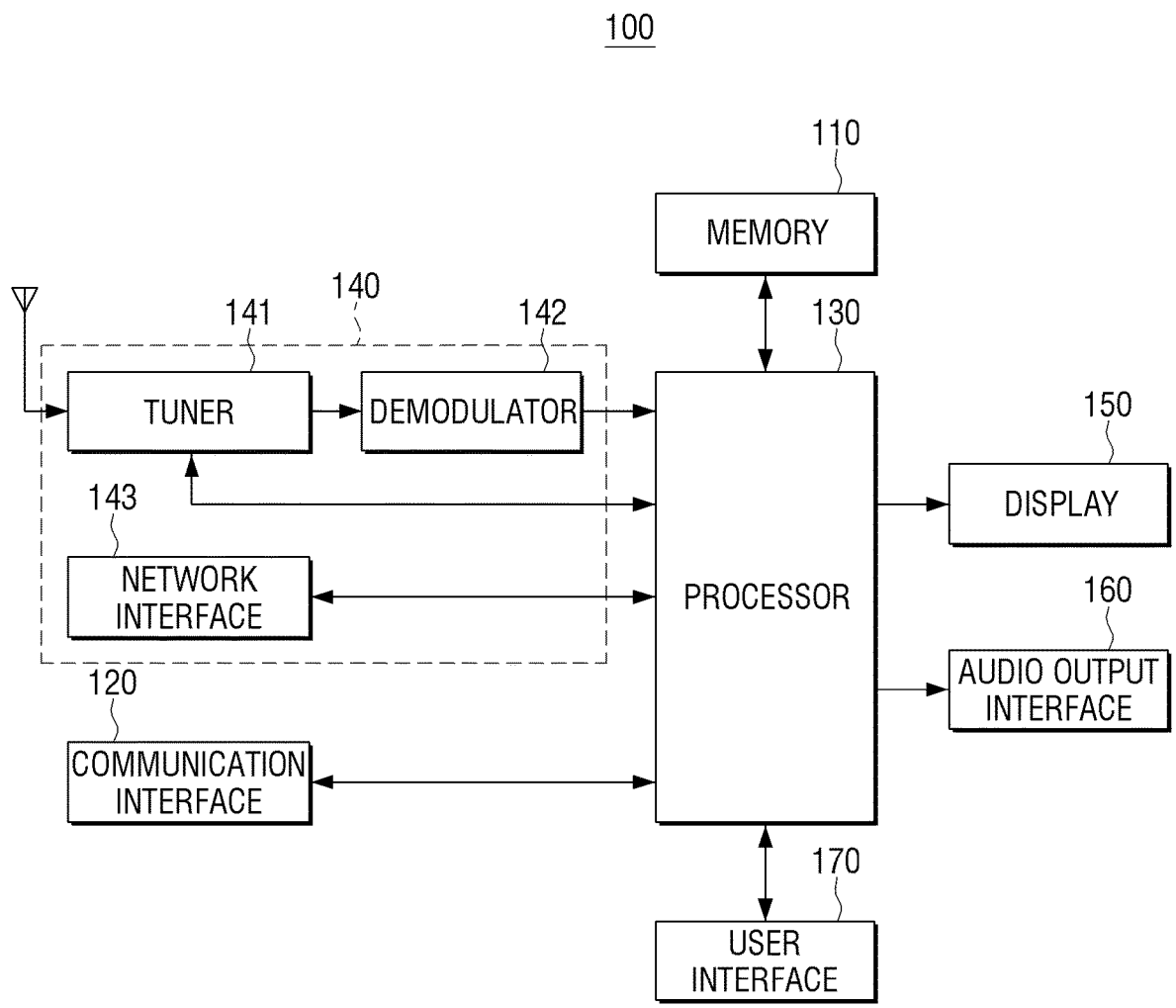
FIG. 3 is a detailed block diagram of an electronic apparatus according to FIG. 2.

FIG. 3 is a detailed block diagram of an electronic apparatus according to FIG. 2.

FIG. 3 is a block diagram to describe a specific configuration of the electronic apparatus of FIG. 1.

Referring to FIG. 3, the electronic apparatus 100 includes the memory 110, the communication interface 120, the processor 130, a receiver 140, a display 150, an audio output interface 160, and a user interface 170. The configurations of FIG. 3 overlapping with the configurations of FIG. 2 will not be described.

The memory 110 may store a program for processing and controlling each signal in the processor 130, or store a signal-processed image, a voice or a data signal. Also, the memory 110 may perform functions for temporary storage of an image, a voice, or a data signal inputted from the communication interface 120 or a network interface 143.

The receiver 140 may include at least one tuner 141, a demodulator 142, and the network interface 143. In some cases, the receiver 140 may include the tuner 141 and the demodulator 142, but may not include the network interface 143, or vice versa. The tuner 141 receives a radio frequency (RF) broadcast signal by tuning a channel selected by a user or all pre-stored channels among RF broadcast signals received through an antenna. The demodulator 142 may receive and demodulate a digital intermediate frequency (DIF) signal converted by the tuner 141 and may perform channel decoding, or the like.

The network interface 143 provides an interface for connecting the electronic apparatus 100 with a wired/wireless network including the Internet network. The network interface 143 may include, for example, Ethernet terminal for network connection, and use communication standards, for example, wireless LAN (WLAN) Wi-Fi, wireless broadband (Wibro), world interoperability for microwave access (Wimax), high speed downlink packet access (HSDPA) or the like for connection with wireless network.

The display 150 may generate a driving signal by converting an image signal, a data signal, an on-screen display (OSD) signal processed by the processor 130, or an image signal, a data signal, or the like, received by the external interface into red, green, and blue (R, G, B), respectively. The display 150 may be implemented as a plasma display panel (PDP), a liquid crystal display (LCD), an organic light-emitting diode (OLED), a flexible display, a three-dimensional display (3D) display, a touch screen, or the like.

Here, the electronic apparatus 100 may directly control the display included in the electronic apparatus 100. The electronic apparatus 100 may determine a content displayed on the display and display through the display.

In the meantime, the electronic apparatus 100 according to still another embodiment may be implemented as a form of generating a video signal and transmitting the generated video signal to an external display device. The electronic apparatus 100 may output the video signal and transmit the video signal to an external display device, and the external display device may receive the video signal outputted from the electronic apparatus 100 and display the content on the display.

The audio output interface 160 may receive an input of a voice-processed signal, for example, a stereo signal, 3.1 channel signal, or 5.1 channel signal, and output the signal as a voice. The audio output interface 160 may be implemented as various types of speakers.

The user interface 170 transmits a command inputted by a user to the processor 130 or transmits the signal of the processor 130 to the user. For example, the user interface 170 may be implemented as a format to communicate with a remote control device or a key panel format provided in the electronic apparatus 100, according to various communication types such as the RF communication method and the IR communication method, or the like.

In FIG. 3, it is illustrated that the electronic apparatus 100 includes the display, but the electronic apparatus 100 may not include the display, or the electronic apparatus 100 may be an electronic apparatus 100 which controls a separate display device.

Meanwhile, the electronic apparatus 100 may simultaneously communicate with the external server and the external device. Specifically, the electronic apparatus 100 may receive data from the external device and transmit the data to the external server. In this case, the communication interface of the electronic apparatus 100 which communicates with the external device and the external server may be configured as one module. The one module may be Wi-Fi.

In the meantime, the communication interface of the electronic apparatus 100 may be configured as a plurality of modules and communicate with the external device or the external server using different communication interfaces, respectively. For example, communication interface 120 of the electronic apparatus 100 may communicate with the external device using Bluetooth module and communicate with the external server using Ethernet model or the Wi-Fi module.

In the meantime, the electronic apparatus 100 according to still another embodiment may not include the display and may be connected to a separate display device. In this case, the processor may control the communication interface to transmit video and audio signals to a separate display device.

The display device may include the display and the audio output interface to receive and output the video and audio signals. The audio output interface may include a speaker, a headphone output terminal, or Sony/Philips Digital Interconnect Format (S/PDIF) output terminal to output audio data.

In this case, the electronic apparatus 100 may include an output port for transmitting the video and audio signals to the display device. Here, the output port of the electronic apparatus 100 may be a port for simultaneously transmitting the video and audio signals at the same time. For example, the output port may be one interface among HDMI, display port (DP), and Thunderbolt.

In the meantime, the output port of the electronic apparatus 100 may be configured as separate ports for transmitting video and audio signals, respectively.

In addition, the electronic apparatus 100 may use a wireless communication module to deliver video and audio signals to a display device. The wireless communication module is a module that is connected to an external network for performing communication according to a wireless communication protocol such as Wi-Fi, Institute of Electrical and Electronics Engineers (IEEE), or the like. In addition, the wireless communication module may further include a mobile communication module for performing communication by accessing a mobile communication network according to various mobile communication standards such as third generation (3G), 3rd Generation Partnership Project (3GPP), Long Term Evolution (LTE), and LTE Advanced (LTE-A).

FIG. 4 is a view to describe a format type of an IR signal.

Referring to FIG. 4A, the format of the IR signal may be described. The IR signal may divide an area into "start", "field", "address", and "command". This may be a format of the signal data that is defined by a preset order. In FIG. 4A, 2.685 ms represents a time when high portion of the start area is inputted. In addition, 3.58 ms represents a time when a high portion and a low portion are inputted in the start area. The electronic apparatus 100 may analyze the IR signal by integrating the information. Referring to FIG. 4A, the part corresponding to "2.685 ms" in which the high is input may mean a start of a data frame as a header mark.

Referring to FIG. 4B, an operation of analyzing the features of the IR signal may be described. The IR signal or converted IR signal may include at least one of timing information 50, carrier frequency information 55, logic definition information 60, and waveform information 65.

Referring to FIG. 4B, the portion (or region) corresponding to 560 µs (micro seconds) may be a bit maker which may be criteria for dividing bits. The portion corresponding to 2.25 ms is a one space and may represent bit "1". The portion corresponding to 1.12 ms is a zero space and may mean "0."

Based on FIG. 4B, 0 and 1 of bit may be divided, and the IR signal may be generated as FIG. 4A by using this.

The timing information 50 may indicate a time period during which the IR signal is inputted. For example, the timing information 50 may mean the time from the moment when the first IR signal is inputted to the moment when the next IR signal is inputted. In FIG. 4B, 2.2 ms and 1.12 ms may correspond to the timing information. The carrier frequency information 55 may mean the frequency of the input IR signal. In FIG. 4B, the frequency may be correspond to 38 kHz. The logic definition information 60 may mean an area divided based on a time interval at which the IR signal is inputted. The waveform information 65 may mean waveform information of the waveform to which the IR signal is inputted.

The electronic apparatus 100 may analyze the received IR signal using at least one of the timing information 50, the carrier frequency information 55, the logic definition information 60, and the waveform information 65 of the IR signal or the converted IR signal. The electronic apparatus 100 may identify the code set information corresponding to the received IR signal by comparing the information on the received IR signal with the prestored plurality of pieces of code set information.

FIG. 5 is a view to describe a plurality of pieces of code set information stored in a memory of an electronic apparatus.

Referring to FIG. 5, the code set information may include at least one of the manufacturer, the product type, the product code, the model number, the control operation (function), and a key value.

The manufacturer means a company producing a device, and the product type may mean a device name indicating which function the device may have. The product code may mean a code including at least one of a manufacturer or a product type. The model number may be an identification number for distinguishing a model year, a function, a color, or the like, among the same product types. The control operation is a function performed in the device and may mean an operation performed when a button is pressed in a remote controller. The key value may mean the IR signal value transmitted from the remote controller for performing a control operation.

Referring to FIG. 5, a plurality of pieces of code set information may include at least one information among a manufacturer, a product type, a product code, a model number, a control operation or function, and a key value. The electronic apparatus 100 may update the plurality of pieces of code set information described above as firmware. In other words, the electronic apparatus 100 may receive the firmware at a predetermined cycle or interval and update the plurality of pieces of code set information.

Figure 6:
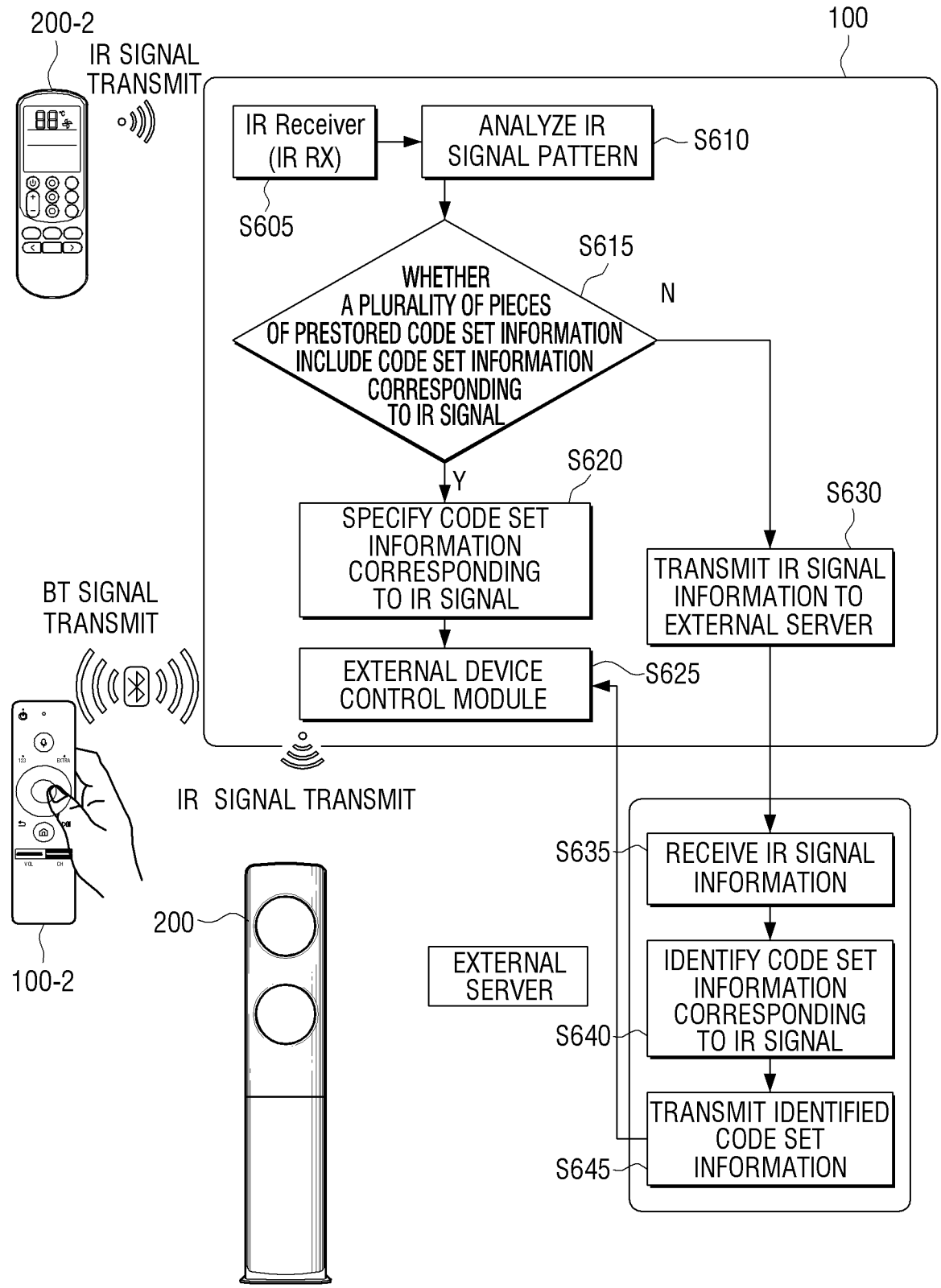
FIG. 6 is a flowchart to describe an external device control system according to an embodiment.
Figure 7:
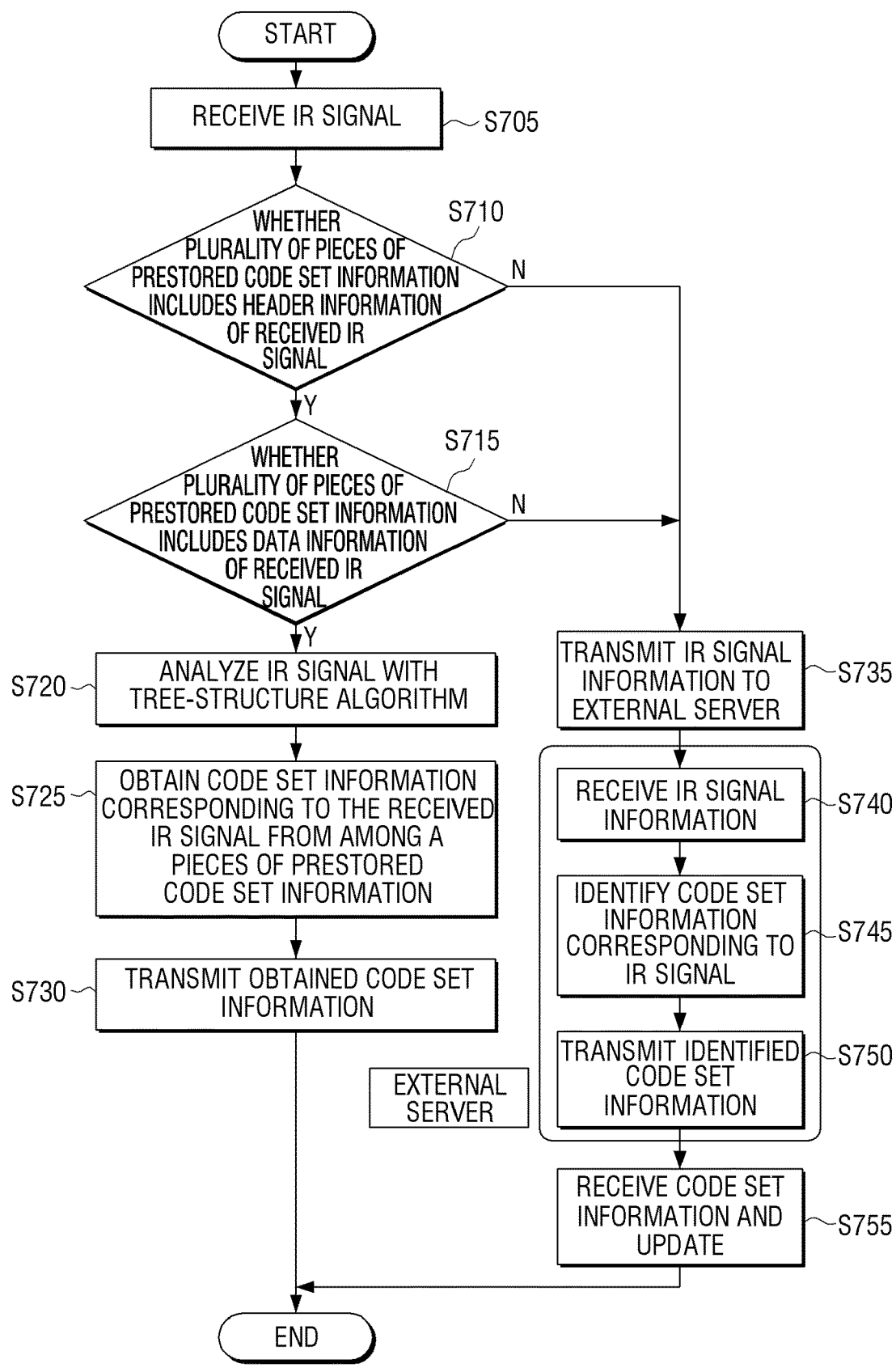
FIG. 7 is a flowchart to describe an external device control system according to an embodiment.

FIGS. 6 and 7 are flowcharts to describe an external device control system according to an embodiment.

Referring to FIG. 6, the remote controller 200-2 of the external device 200 may transmit the IR signal to the electronic apparatus 100 by pressing a specific button. The IR receiver (IR RX) of the electronic apparatus 100 may receive the IR signal transmitted from the remote controller 200-2 of the external device 200 in step S605.

The electronic apparatus 100 may analyze the received IR signal in step S610. The IR signal may include a plurality of information. To be specific, the timing information, carrier frequency information, logic definition information, waveform information, or the like, may be included.

The electronic apparatus 100 may identify whether the plurality of pieces of prestored code set information include the code set information corresponding to the received IR signal in step S615. Specifically, the electronic apparatus 100 may identify whether the information included in the received IR signal matches the plurality of pieces of code set information stored in the memory of the electronic apparatus 100.

When the code set information corresponding to the received IR signal is included in the plurality of pieces of prestored code set information, the electronic apparatus 100 may specify the corresponding code set information to the code set information corresponding to the received IR signal in step S620. The electronic apparatus 100 may transmit the specified code set information to the external device control module in step S625.

If the code set information corresponding to the received IR signal is not included in the plurality of pieces of prestored code set information, the electronic apparatus 100 may transmit information on the received IR signal to an external server in step S630. Here, the electronic apparatus 100 may transmit information on the IR signal to an external server by using a separate communication method other than an IR method.

The external server may receive the information on the IR signal from the electronic apparatus 100 in step S635. The external server may identify whether the code set information corresponding to the received IR signal is present in the library including the plurality of pieces of code set information in step S640. The external server, when the code set information corresponding to the IR signal is identified, may transmit the identified code set information to the electronic apparatus 100 in step S645. The electronic apparatus 100 may transmit the identified code set information to the external device control module in step S625.

When the step S625 is terminated, a process of registering the external device to the electronic apparatus 100 is completed. A user may transmit the IR signal through the electronic apparatus 100 using the code set information transmitted to the external device control module. Consequently, the user may remotely control the external device 200 using only the electronic apparatus 100 and the remote controller 100-2 of the electronic apparatus 100 without using the remote controller 200-2 of the external device 200.

FIG. 7 is a view which specifies some operations of FIG. 6. Referring to FIG. 7, the electronic apparatus 100 may receive the IR signal in step S705. The electronic apparatus 100 may identify whether the plurality of pieces of prestored code set information include the header information of the received IR signal in step S710. The header information may include at least one information among the manufacturer and the product type. That is, the electronic apparatus 100 may identify whether the plurality of pieces of prestored code set information include the specific information (header information) of the received IR signal.

When the specific information (header information) of the received IR signal is included in a plurality of pre-stored code set information, the electronic apparatus 100 may identify whether the data information of the received IR signal is included in the plural of prestored code set information in step S715. Here, the data information may be at least one of timing information, carrier frequency information, logic definition information, and waveform information.

When the plurality of pieces of prestored code set information includes the data information of the received IR signal, the electronic apparatus 100 may analyze the IR signal with a tree-structure algorithm in step S720. The tree-structure algorithm may mean an algorithm which divides an item into an upper item and a lower item to gradually reduce the search target. Specifically, the electronic apparatus 100 may analyze the IR signal by sequentially using the data information (timing information, carrier frequency information, logic definition information, and waveform information) of the received IR signal in step S720. Here, timing information, carrier frequency information, logic definition information, and waveform information are sequentially described, but the order may be changed according to a user's setting. In the meantime, when the electronic apparatus has already identified the code set information corresponding to the received IR signal, the step S720 may be omitted in some cases.

The electronic apparatus 100 may obtain the code set information corresponding to the received IR signal among the plurality of pieces of prestored code set information through the aforementioned IR signal analysis process in step S725. The electronic apparatus 100 may transmit the code set information corresponding to the received IR signal to the module or application for remote control in step S730. The user may control the external device using the remote control module or application having the code set information corresponding to the received IR signal stored therein.

In the meantime, when the header information of the received IR signal is not included in the plurality of pieces of prestored code set information, the electronic apparatus 100 may transmit the information on the received IR signal to the external server in step S735.

Here, the electronic apparatus 100 may transmit the information on the IR signal to the external server using the local area network (LAN) method. Here, the LAN method has been described, but various communication methods capable of transmitting data may be applied.

The external server may receive information on the IR signal from the electronic apparatus 100 in step S740. The external server may identify whether the code set information corresponding to the IR signal is included in a separate library stored in the external server in step S745.

When the code set information corresponding to the IR signal is included in the separate library stored in the external server, the external server may transmit the identified code set information to the electronic apparatus 100 in step S750.

The electronic apparatus 100 may receive and update the code set information received from the external server in step S755. The electronic apparatus 100 may store the code set information received from the external server in the memory 110 and update the existing plurality of pieces of code set information. In step S710 or S715, only when the code set information corresponding to the received IR signal is not identified, the information on the IR signal may be transmitted to the external server. Therefore, receiving the code set information from the external server may mean that the corresponding code set information may not be stored in the electronic apparatus 100. Therefore, when the electronic apparatus 100 receives the code set information from the external server, the electronic apparatus 100 may add new code set information received from the external server separately from the existing plurality of pieces of code set information.

Figure 8:
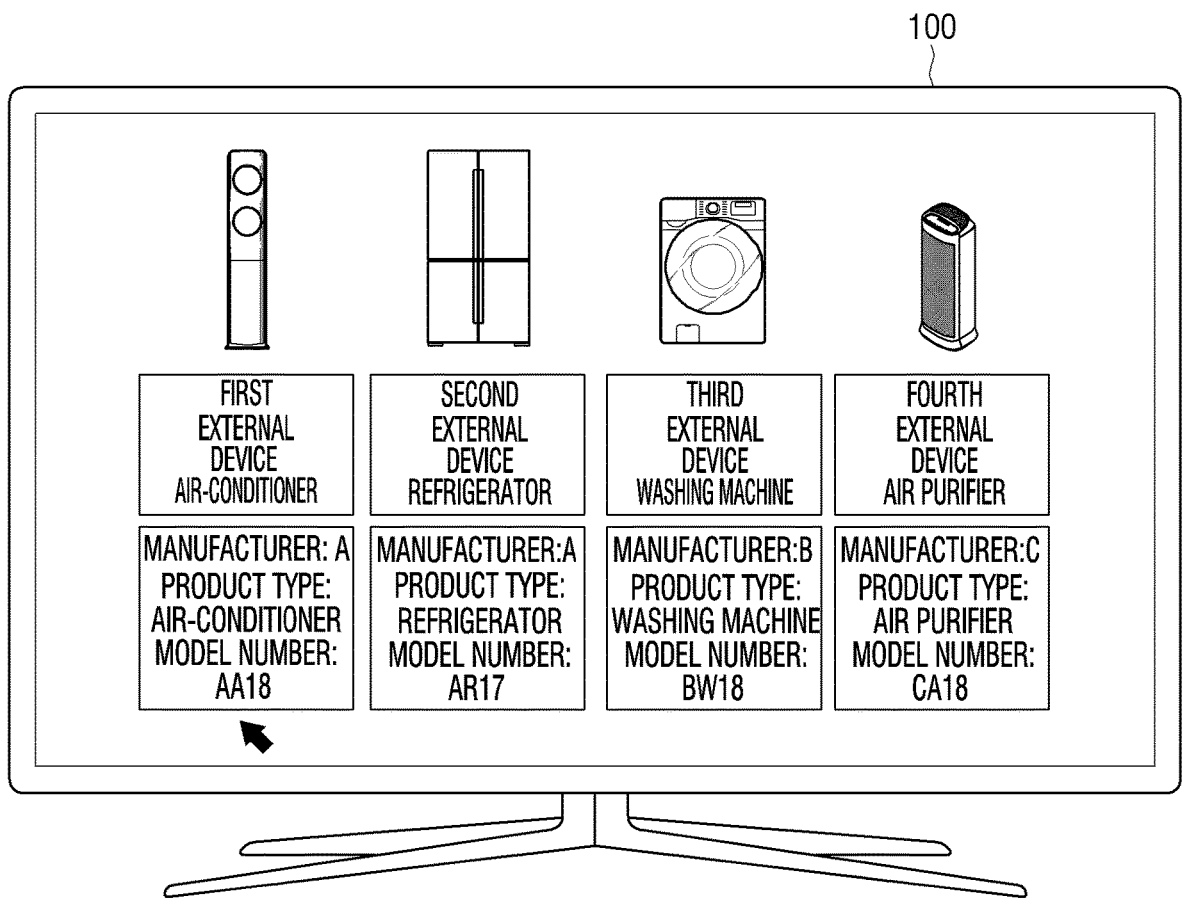
FIG. 8 shows a UI for selecting a plurality of external devices registered in an electronic apparatus, according to an embodiment.

FIG. 8 is a view to describe a UI for selecting a plurality of external devices registered in an electronic apparatus.

Referring to FIG. 8, the electronic apparatus 100 may store a plurality of external devices registered by a user. The electronic apparatus 100 may display and provide a UI including information of registered external devices. For example, at least one of a registration number, a manufacturer, a product type, a product code, a model number, a drawing of a registered device of the external device may be included in the UI.

The user may select the external device to control through the UI provided by the electronic apparatus 100. When the user selects the external device using the UI provided by the electronic apparatus 100, the remote controller 100-2 of the electronic apparatus 100 may be used.

When the display of the electronic apparatus 100 is implemented as a touch screen, a user may directly touch the display to select a display.

In this Specification, it has been described that the electronic apparatus 100 is a TV including the display, but the electronic apparatus 100 may be an electronic apparatus which does not include the display, and the electronic apparatus 100 may be implemented as a form to transmit information and data to a separate electronic apparatus including the display.

In the meantime, the electronic apparatus 100, when the user selects a specific external device, may provide a UI for directly controlling the external device. However, the electronic apparatus 100 may provide a UI for confirming the code set information of the target device which the user intends to control, prior to providing the UI for controlling the external device. The UI will be described with reference to FIGS. 9 to 11.

Figure 10:
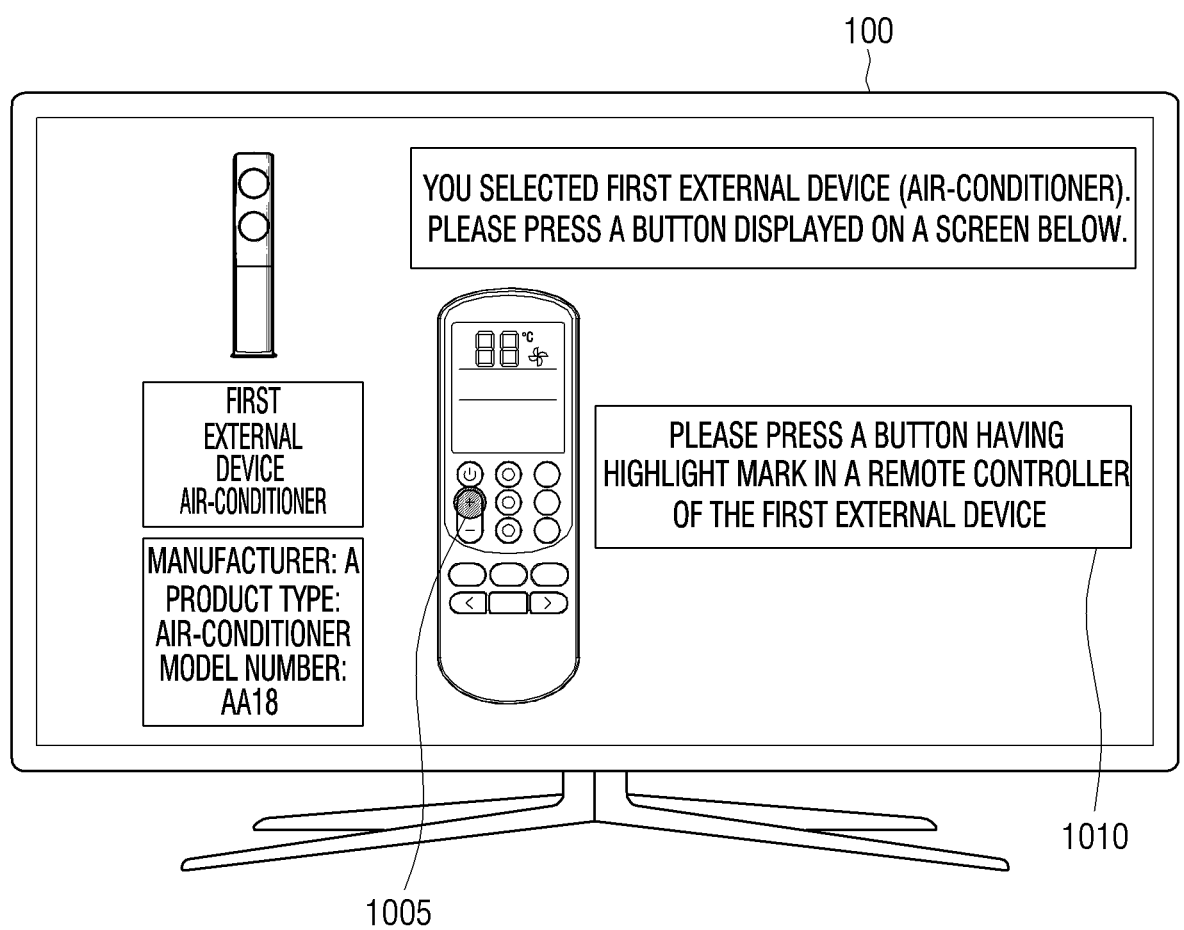
FIG. 10 shows a UI for confirming a remote controller of an external device selected by an electronic apparatus by a user, according to an embodiment.
Figure 11:
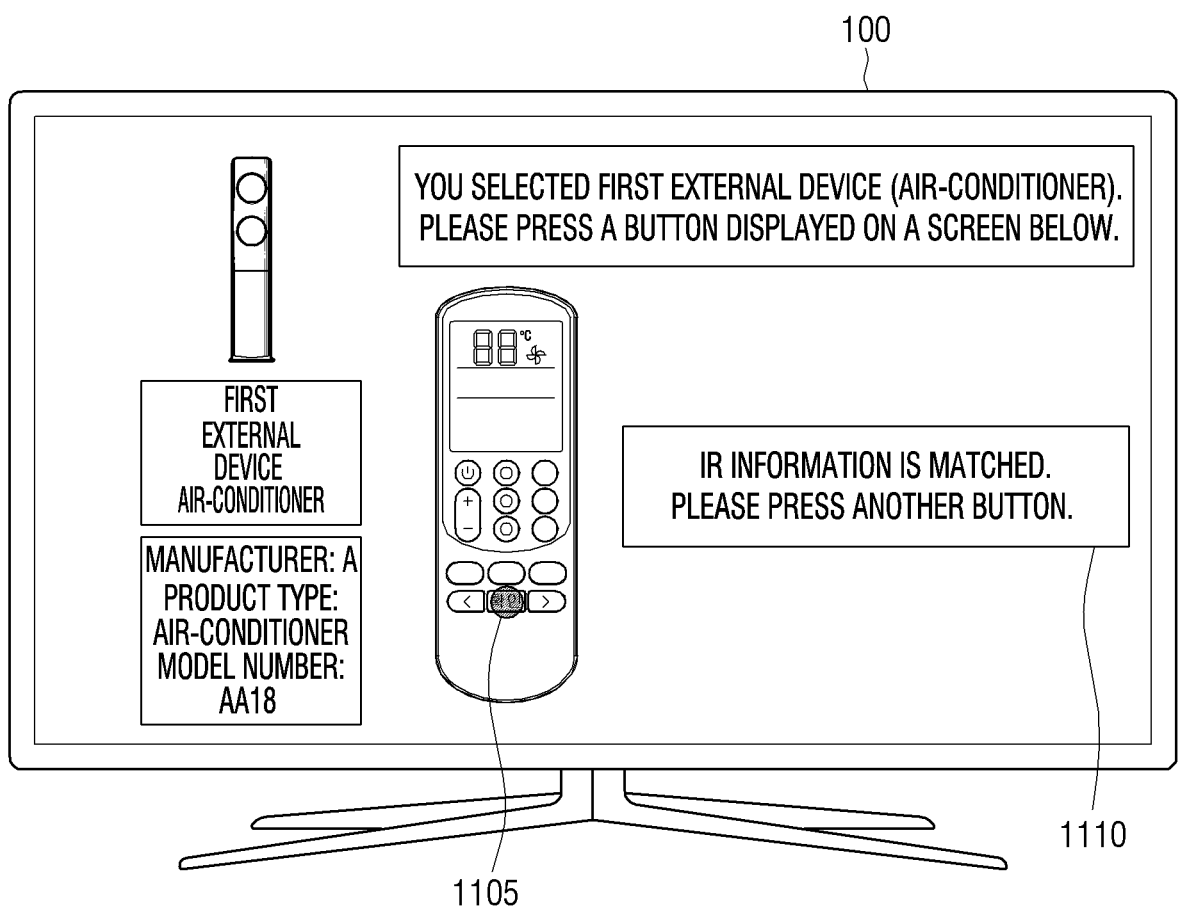
FIG. 11 shows a UI for confirming a remote controller of an external device selected by an electronic apparatus by a user, according to an embodiment.

FIGS. 9 to 11 are views to describe a UI for confirming a remote controller of an external device selected by an electronic apparatus by a user.

In an embodiment illustrated in FIG. 9, the user selects an air-conditioner of company A which is a first external device, among a plurality of external devices displayed in FIG. 8.

The electronic apparatus 100 may display a drawing 905 of the remote controller corresponding to the external device 200 selected by the user. Here, the drawing 905 of the remote controller may be included in the plurality of pieces of code set information prestored in the electronic apparatus 100. Even if the drawing is not included in the code set information, the electronic apparatus 100 may separately store the drawing of the remote controller corresponding to the code set information. When the electronic apparatus 100 displays the drawing 905 of the remote controller of the external device 200 selected by the user, the user may compare whether registration of the external device 200 is performed correctly by comparing with the remote controller 200-2 of the actual external device 200. The electronic apparatus 100 may provide a UI 910 inquiring whether the drawing 905 of the remote controller displayed on a screen is identical with the actual remote controller, other than the UI displaying the drawing 905 corresponding to the remote controller 200-2 of the external device 200.

When the user selects an item corresponding to YES for the UI 910 asking whether the drawing 905 is identical with the actual remote controller, the electronic apparatus 100 may maintain the external device 200 which has been registered already. When the user selects an item corresponding to NO for the UI 910 asking whether the drawing 901 is identical with the actual remote controller, the electronic apparatus 100 may delete a relation between the pre-registered electronic apparatus 100 and the external device 200. That is, the electronic apparatus 100 may delete the registration state of the external apparatus 200. The electronic apparatus 100 may transmit a content that the code set information corresponding to the identified received IR signal is not correct information to the external server.

FIG. 10 includes a UI for confirming the code set information of the external device 200 selected by the user.

Based on the user pressing the button of the remote controller, the remote controller generates IR signal corresponding to the button and transmits the IR signal. In addition, the electronic apparatus 100 receives the IR signal and identifies whether the received IR signal is a signal corresponding to which device among the plurality of external devices which is stored in the memory. For example, when the user selects one button from the step of S605 in FIG. 6, the electronic apparatus 100 may receive the IR signal corresponding to the button selected by the user, identify the code set information corresponding to the received IR signal, and register the external device 200. In this process, it may be confirmed whether the IR signal for one button selected by the user matches the IR signal included in the code set information prestored in the electronic apparatus 100. Here, when the user selects one button, an operation to compare the IR signal for one button may be performed, but an operation to compare the IR signal for buttons other than the selected one button may not be performed.

Therefore, the electronic apparatus 100 may additionally request the IR signal of the external device 200 to perform more accurate registration of an external device.

Referring to FIG. 10, the electronic apparatus 100 may provide a UI including the guide information to make a user press a specific button. The electronic apparatus 100 may add a highlight mark 1005 on the drawing illustrating the remote controller 200-2 of the electronic apparatus 200. The electronic apparatus 100 may provide guide information 1010 to make a user press a button having the highlight mark 1005. The user may easily recognize which button to press through the highlight mark 1005.

When the user presses the button having the highlight mark 1005 in the remote controller 200-2 of the external device 200, a corresponding IR signal may be transmitted. Here, the electronic apparatus 100 may compare the prestored code set information corresponding to the button having the highlight mark 1005 with the received IR signal to confirm matching.

When the prestored code set information corresponding to the button having the highlight mark 1005 matches the received IR signal, the electronic apparatus 100 may determine that the registered information is accurate.

However, when the prestored code set information corresponding to the button having the highlight mark 1005 does not match the received IR signal, the electronic apparatus 100 may delete a relation between the pre-registered electronic apparatus 100 and the external device 200. That is, the electronic apparatus 100 may delete the registration state of the external device 200. In addition, the electronic apparatus 100 may transmit a content indicating that the code set information corresponding to the identified received IR signal is not correct to the external server.

FIG. 11 is a view to describe a process to confirm information on another button other than a button confirmed in FIG. 10.

The electronic apparatus 100 may provide guide information 1110 to make a user confirm one button and press another button. Here, the electronic apparatus 100 may also provide a highlight mark 1105 for a button a user has to press in the remote controller 200-2 of the external device 200.

In describing FIGS. 10 and 11, it has been described that a drawing corresponding to the remote controller 200-2 of the external device 200 is displayed, but a drawing may not be displayed according to an embodiment, and only guide information to make a user press a specific function may be implemented. For example, the electronic apparatus 100 may provide only guide information to make a user press a temperature down button.

Figure 12:
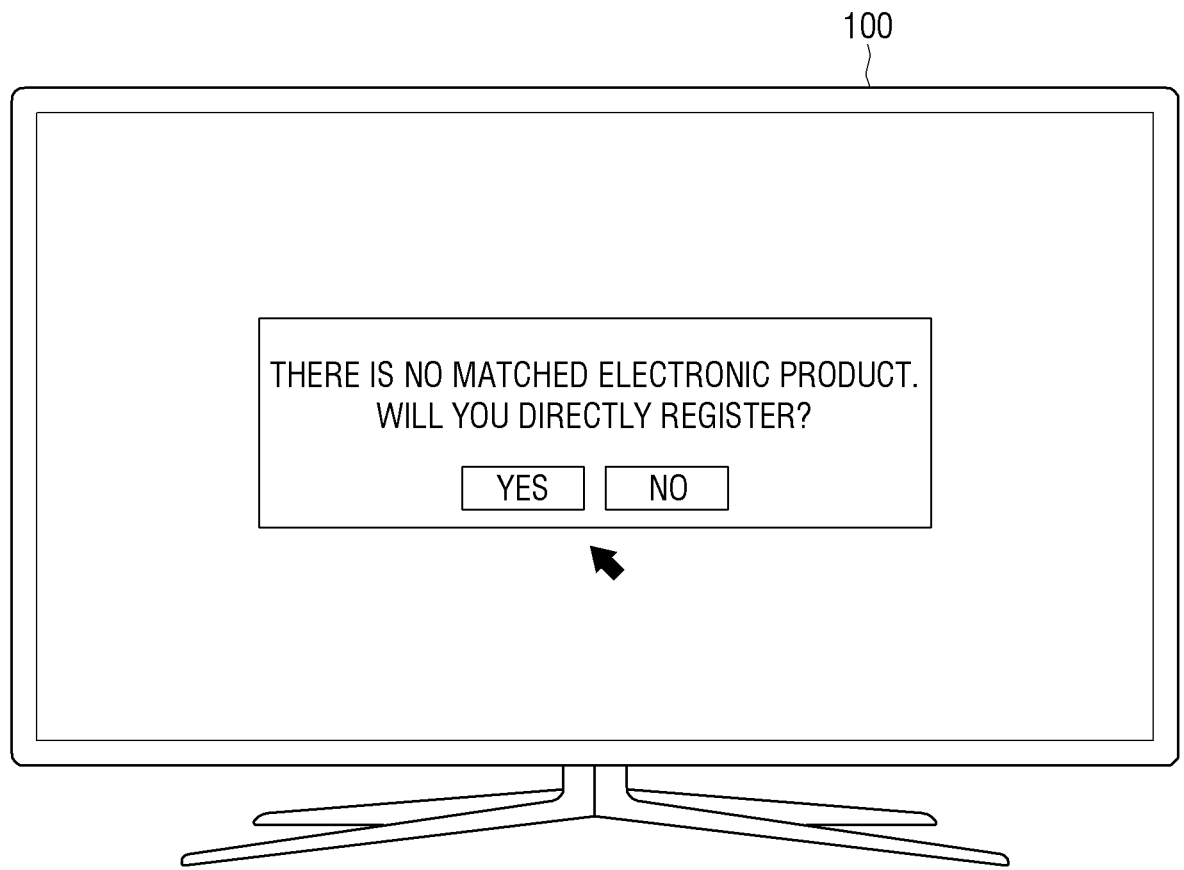
FIG. 12 shows a UI to be provided when the code set information corresponding to the received IR signal is not identified, according to an embodiment.

FIG. 12 is a view to describe a UI to be provided when the code set information corresponding to the received IR signal is not identified.

If the plurality of pieces of prestored code set information does not include the code set information corresponding to the received IR signal, and the code set information corresponding to the received IR signal is not identified through a search process through the external server, the electronic apparatus 100 may determine that the code set information corresponding to the received IR signal may not be searched.

In this case, the electronic apparatus 100 may not register the external device 200. Here, the electronic apparatus 100 may provide a UI to guide a user to directly register the external device 200. The process of registering the external device 200 directly by the user is as shown below. The electronic apparatus may guide a user to directly input at least one information among the manufacturer, product type, product code, model number, and key set of the user.

The electronic apparatus 100 may receive an input of information on the manufacturer and the product type from the user and request an IR signal to the user in a predetermined manner. The electronic apparatus 100 may display a function corresponding to the product type and receive the IR signal by pressing a button corresponding to the function. For example, in an embodiment the user selected an air-conditioner. The electronic apparatus 100 may provide a sentence of "press temperature up button". When the user presses the temperature up button of the remote controller 200-2 of the external device 200, the electronic apparatus 100 may receive the IR signal corresponding to the temperature up button of the remote controller 200-2 of the external device 200. Then, the electronic apparatus 100 may map and store the corresponding IR signal to the up button of the remote controller 200-2 of the external device 200.

The electronic apparatus 100 may receive the IR signal corresponding to main buttons corresponding to the product type by a method described above to register an external device.

Figure 13:
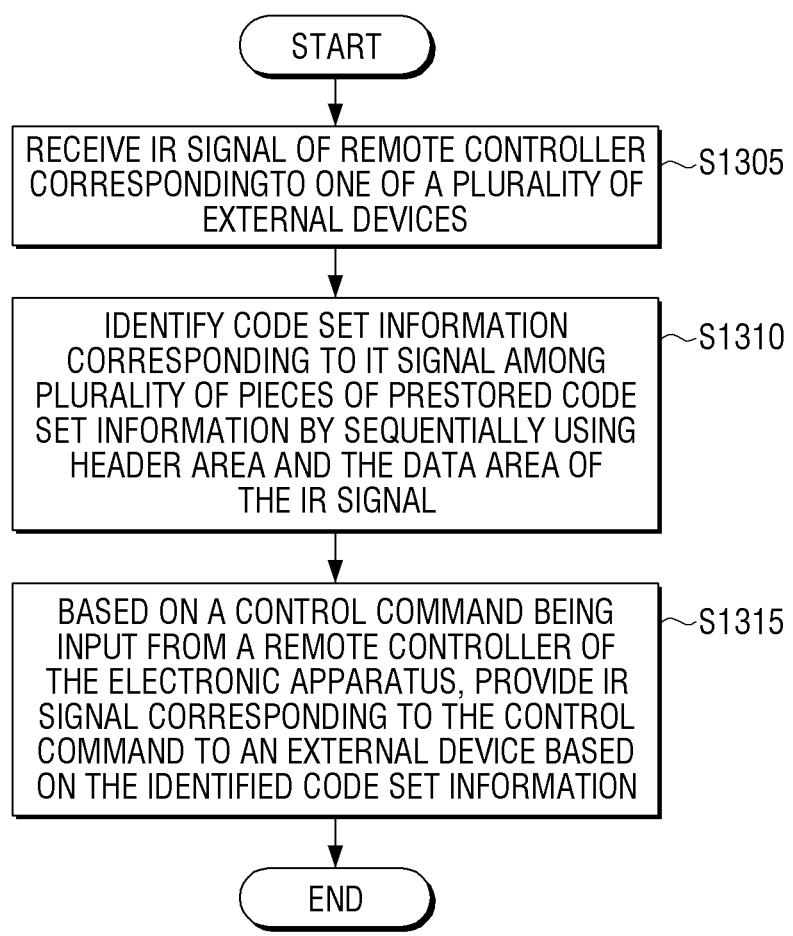
FIG. 13 shows a controlling method of an electronic apparatus according to an embodiment.

FIG. 13 is a view to describe a controlling method of an electronic apparatus according to an embodiment.

Referring to FIG. 13, a method of controlling the electronic apparatus 100 according to an embodiment may receive the IR signal of a remote controller corresponding to one of a plurality of external devices in step S1305. Then, the code set information corresponding to the IR signal among the plurality of pre-stored code set information may be identified using the header area and the data area of the IR signal sequentially in step S1310. When a control command is inputted from the remote controller of the electronic apparatus 100, the IR signal corresponding to the control command may be provided to the external device based on the identified code set information in step S1315.

Here, the header area of the IR signal may include a signal pattern corresponding to the manufacturer and the product type, and the data area may include a signal pattern corresponding to the control command to perform a specific operation.

In addition, the step of S1310 to identify the code set information corresponding to the IR signal may sequentially compare the information included in the header area and the data area of the received IR signal with a plurality of pre-stored code set information according to a preset order.

Meanwhile, when the code set information corresponding to the received IR signal is not identified, the controlling method may transmit information on the received IR signal to the external server, and receive the code set information corresponding to the IR signal received from the external server. The controlling method may include updating to add the received code set information to a plurality of pre-stored code set information.

In addition, the controlling method may include providing a UI for guiding the user to directly update the IR signal of the external device, when the code set information corresponding to the IR signal received from the external server is not received for a predetermined time.

Here, the code set information may include at least one of the manufacturer, the product type, the product code, the model number, and the key set, and the key set may include the information which maps a key value and the function corresponding to the key value. (or the key set may include a key value of the plurality of external devices and the mapping information between the key value and the function corresponding to the key value)

The controlling method may include updating the plurality of pre-stored code set information in a predetermined cycle or adding new code set information.

The controlling method, if the code set information corresponding to the IR signal is identified, may provide a UI for registering the identified code set information. In addition, the UI may include at least one of an image of a remote controller corresponding to the external device, a manipulation state of each button included in the remote controller, and functions of each button.

In the meantime, the controlling method of the electronic apparatus 100 as FIG. 13 may be implemented by an electronic apparatus having the configurations of FIG. 2 or FIG. 3, or by an electronic apparatus having other configurations as well.

The methods according to various embodiments may be implemented as a format of an application which may be installed in an existing electronic apparatus.

The methods according to various embodiments may be implemented only by software upgrade or hardware upgrade of an existing electronic apparatus.

It is also possible that the various embodiments described above are performed through an embedded server provided in an electronic apparatus or an external server of the electronic apparatus.

The various embodiments described above may be implemented in a recordable medium which is readable by computer or a device similar to computer using software, hardware, or the combination of software and hardware.

By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, embodiments described herein may be implemented by the processor 130 itself. According to a software implementation, embodiments such as the procedures and functions described herein may be implemented with separate software modules. Each of the above-described software modules may perform one or more of the functions and operations described herein.

Meanwhile, the computer instructions for performing the processing operations in the electronic apparatus according to the various embodiments of the present disclosure described above may be stored in a non-transitory computer-readable medium. The computer instructions stored in this non-transitory computer-readable medium cause the above-described specific device to perform the processing operations in the electronic apparatus according to the above-described various embodiments when executed by the processor of the specific device The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present teaching may be readily applied to other types of devices. Also, the description of the embodiments of the present disclosure is intended to be illustrative, and not to limit the scope of the claims, and many alternatives, modifications, and variations will be apparent to those skilled in the art.

What is claimed is:

1. An electronic apparatus comprising:
a memory storing a firmware including a plurality of pieces of code set information corresponding to a plurality of external devices;
a communication interface; and
a processor configured to:
receive an infrared (IR) signal corresponding to an external device of the plurality of external devices through the communication interface,
identify code set information corresponding to the IR signal among the plurality of pieces of code set information by sequentially using a header area of the received IR signal and a data area of the received IR signal, and
based on a control command being input from a remote controller of the electronic apparatus, generate the IR signal corresponding to the control command based on the identified code set information.

2. The electronic apparatus of claim 1,
wherein the processor is further configured to control the electronic apparatus to transmit an IR signal corresponding to the control command to an external device corresponding to the identified code set information through the communication interface.

3. The electronic apparatus of claim 1,
wherein the header area of the received IR signal comprises a signal pattern corresponding to a manufacturer and a product type, and
wherein the data area of the received IR signal comprises a signal pattern corresponding to a control command for performing a specific operation.

4. The electronic apparatus of claim 3,
wherein the processor is further configured to sequentially compare information included in the header area of the received IR signal and the data area of the received IR signal with a plurality of pieces of code set information stored in the memory according to a predetermined order.

5. The electronic apparatus of claim 1,
wherein the processor is further configured to:
based on the code set information corresponding to the received IR signal not being included in the plurality of pieces of code set information, transmit information corresponding to the received IR signal to an external server, receive the code set information corresponding to the received IR signal from the external server, and
update the plurality of pieces of code set information to include the received code set information to.

6. The electronic apparatus of claim 5,
wherein the processor, based on the code set information corresponding to the received IR signal not being received from the external server for a predetermined time, is further configured to provide a user interface (UI) for guiding a user to directly update the IR signal of the external device.

7. The electronic apparatus of claim 1,
wherein the code set information comprises at least one of a manufacturer, a product type, a product code, a model number, and a key set, and
wherein the key set comprises information which maps a key value to a corresponding function of the key value.

8. The electronic apparatus of claim 1,
wherein the processor is further configured to update the plurality of pieces of code set information included in the firmware at a predetermined interval.

9. The electronic apparatus of claim 1,
wherein the processor, based on the code set information corresponding to the IR signal being identified, is further configured to provide a user interface (UI) for registering the identified code set information, and
wherein the UI comprises at least one of an image of a remote controller corresponding to the external device, a manipulation state of each button included in the remote controller, and a function of each button.

10. The electronic apparatus of claim 1,
wherein the communication interface comprises:
an IR signal interface for receiving an IR signal transmitted from a remote controller of the external device; and
a BLUETOOTH communication interface connected to the remote controller of the electronic apparatus for receiving the control command.

11. A controlling method of an electronic apparatus, the method comprising:
receiving an infrared (IR) signal corresponding to an external device of a plurality of external devices through a communication interface;
identifying code set information corresponding to the IR signal among a plurality of pieces of code set information corresponding to the plurality of external devices by sequentially using a header area of the received IR signal and a data area of the received IR signal; and
based on a control command being input from a remote controller of the electronic apparatus, providing the IR signal corresponding to the control command based on the identified code set information to the external device.

12. The method of claim 11,
wherein the header area of the received IR signal comprises a signal pattern corresponding to a manufacturer and a product type, and
wherein the data area of the received IR signal comprises a signal pattern corresponding to a control command for performing a specific operation.

13. The method of claim 12, wherein the identifying of the code set information corresponding to the IR signal comprises sequentially comparing information included in the header area of the received IR signal and the data area of the received IR signal with a plurality of pieces of code set information stored in a memory of the electronic apparatus according to a predetermined order.

14. The method of claim 11, further comprising:
based on the code set information corresponding to the received IR signal not being included in the plurality of pieces of code set information, transmitting information corresponding to the received IR signal to an external server,
receiving the code set information corresponding to the received IR signal from the external server, and
updating the plurality of pieces of code set information to include the received code set information.

15. The method of claim 14, further comprising:
based on the code set information corresponding to the received IR signal not being received from the external server for a predetermined time, providing a user interface (UI) for guiding a user to directly update the IR signal of the external device.

16. The method of claim 11,
wherein the code set information comprises at least one of a manufacturer, a product type, a product code, a model number, and a key set, and
wherein the key set comprises information which maps a key value to a function corresponding to the key value.

17. The method of claim 11, further comprising:
updating a plurality of pieces of code set information included in a firmware of the electronic apparatus at a predetermined interval.

18. The method of claim 11, further comprising:
based on the code set information corresponding to the IR signal being identified, providing a user interface (UI) for registering the identified code set information, and
wherein the UI comprises at least one of an image of a remote controller corresponding to the external device, a manipulation state of each button included in the remote controller, and a function of each button.

* * * * *